United States Patent [19]

Ravenel et al.

[11] Patent Number: 5,674,465
[45] Date of Patent: Oct. 7, 1997

[54] CONTINUOUS PROCESS FOR THE PREPARATION OF ALUMINUM NITRIDE BY THE CARBONITRIDING OF ALUMINA

[75] Inventors: Pierre Ravenel, Saint-Genis Laval; Roland Bachelard, Lyons; Jean-Pierre Disson, Voiron; Philippe Joubert, Lyons, all of France

[73] Assignee: Elf Atochem S.A., France

[21] Appl. No.: 592,850

[22] Filed: Jan. 24, 1996

Related U.S. Application Data

[63] Continuation of Ser. No. 279,662, Jul. 25, 1994, abandoned, which is a continuation of Ser. No. 901,283, Jun. 19, 1992, abandoned.

[30] Foreign Application Priority Data

Jun. 19, 1991 [FR] France .................... 91 07521

[51] Int. Cl.⁶ .................................... C01B 21/072
[52] U.S. Cl. .................................... 423/412
[58] Field of Search .................................... 423/412

[56] References Cited

U.S. PATENT DOCUMENTS

| | | |
|---|---|---|
| 3,032,398 | 5/1962 | Clair . |
| 4,618,592 | 10/1986 | Kuramoto et al. . |
| 4,851,203 | 7/1989 | Bachelard et al. ............ 423/412 |
| 4,983,553 | 1/1991 | Dunn et al. ............ 423/412 |
| 5,112,579 | 5/1992 | Dunn et al. . |
| 5,126,121 | 6/1992 | Weimer et al. ............ 423/412 |
| 5,154,907 | 10/1992 | Kim et al. ............ 423/412 |
| 5,370,854 | 12/1994 | Henley et al. ............ 423/412 |

FOREIGN PATENT DOCUMENTS

| | | |
|---|---|---|
| 0 431927 A1 | 6/1991 | European Pat. Off. . |
| 59-111905 | 10/1982 | Japan . |
| 63-277504 | 11/1988 | Japan . |
| 2051841 | 2/1990 | Japan . |
| 122829 | 6/1920 | United Kingdom . |

OTHER PUBLICATIONS

United States Patent Application Serial No. 07/673,624 filed Mar. 22, 1991.

Sprechsaal, vol. 117, No. 7, Juillet 1984, Coburg de, pp. 627–629.

F.K. Van Dijen et al., Large Scale Production of Fine Non–oxide Ceramic Powders, Sprechsaal, vol. 117, No. 7 (1984), pp. 627–629.

European Search Report dated Sep. 21, 1992, Examiner Reedijk A.M.E., Location: La Haye.

Patent Abstracts of Japan, vol. 8, No. 225 (C–247)(1662), Oct. 16, 1984 & JP–59 111 905.

Sprechsaal, vol. 117, No. 7, Juillet 1984, Coburg de, pp. 627–629, F.K. Van Dijen et al.: "Large Scale Production of Fine Non–Oxide Ceramic Powders".

Primary Examiner—Wayne Langel
Attorney, Agent, or Firm—Bell, Boyd & Lloyd

[57] ABSTRACT

The invention relates to a continuous process for the preparation of aluminum nitride by the carbonitriding of alumina. According to this process, a reaction that uses alumina, carbon, and a resin that generates carbon by pyrolysis is performed in a methodical reactor. The invention relates to a continuous process for the preparation of aluminum nitride by the carbonitriding of alumina.

13 Claims, 1 Drawing Sheet

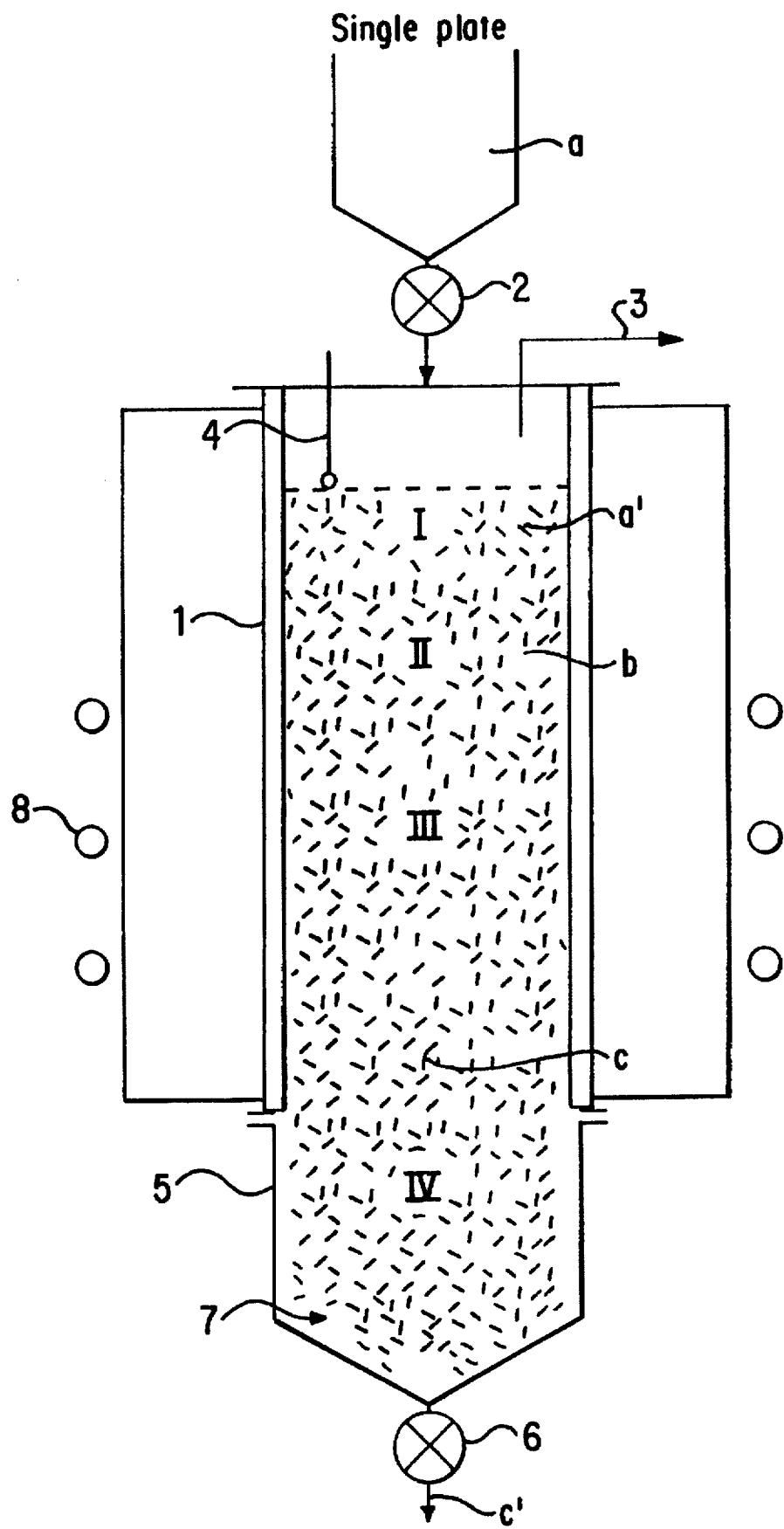

CONTINUOUS PROCESS FOR THE PREPARATION OF ALUMINUM NITRIDE BY THE CARBONITRIDING OF ALUMINA

This is a continuation of application Ser. No. 08/279,662, filed on Jul. 25, 1994, abandoned, which is a continuation of application Ser. No. 07/901,283, filed on Jun. 19, 1992, abandoned.

FIELD OF THE INVENTION

The invention relates to a continuous process for the preparation of aluminum nitride by the carbonitriding of alumina.

According to this process, a reaction that uses alumina, carbon, and a resin that generates carbon by pyrolysis is performed in a methodical reactor.

The invention relates to a continuous process for the preparation of aluminum nitride by the carbonitriding of alumina.

BACKGROUND OF THE INVENTION

The preparation of aluminum nitride has given rise to abundant literature, whether this pertains to the conditions of the reaction resulting in this nitride or to the apparatus or installation used for this reaction.

Thus, it has already been proposed to perform this preparation in a fluidized-bed reactor (see, for example, European Patent Application No. 0 266 927, Japanese Patent Application No. 63[1988]-297205, and British Patent Application No. 87 00208).

It has also been proposed to perform the reaction in a rotating furnace (see, for example, Japanese Patent Applications Nos. 62[1987]-278109, 62[1987]-237937, 63[1988]-20030, and 61[1987]-74635).

It has also been proposed to prepare aluminum nitride in a vertical furnace with a stack of circulating cups (see, for example, European Patent Application No. 0 272 377) or cups that are stationary (Japanese Patent No. 1 290 562).

These different technologies have a certain number of disadvantages: on the one hand, they have in common the fact that they result in a limited productivity because the useful volume of the reactors is always small. Thus, for the sake of information, the usual filling level of a rotating furnace generally does not exceed 13%. This obviously results in high energy expenditures with respect to the quantity of nitride produced.

The rotating furnace is generally characterized by a broad distribution of the time the reagents spend in the furnace, which leads to heterogeneity of the products obtained.

The fluidized-bed reactor has the same defect in the case of continuous use, which generally requires the use of a series of reactors.

It goes without saying that these defects are undesirable and that there is a continual need to increase the productivity of the equipment, to improve the homogeneity of the product and the reliability of the processes of manufacturing said product.

The invention therefore proposes a new continuous process for the preparation of aluminium nitride by the carbonitriding of alumina; this process is characterized by the fact that the reaction is conducted in a methodical reactor.

The expression "methodical reactor" is used here in its conventional sense, namely it designates a reactor in which each grain of reagent participates in the reaction, and all the grains of reagents participate in essentially the same manner.

The invention more precisely relates to such a process, characterized by the fact that the reaction between alumina, carbon, and nitrogen is performed in a continuous, circulating-bed reactor, functioning at constant filling levels, with homogeneous and constant time levels spent by the reagents, and with percolation of the load under conditions ensuring a homogeneous composition of the gaseous phase around each particle at a given level, along with intense heat exchanges and transfer of mass.

In this process, a constant filling level can be obtained by the use of a level sensor acting on the introduction device of the reactor.

The homogeneous, constant time spent can be obtained by continuous extraction, for example, by a weight or volume measurer, located at the base of the circulating bed and with a piston-type flow of the load into a tube with a constant cross section.

The percolation of the load advantageously occurs using nitrogen circulating against the stream of solids and at a high speed between the grains.

BRIEF DESCRIPTION OF THE DRAWINGS

On a purely illustrative basis, the process and the reactor allowing for its implementation are represented in the appended FIGURE.

This FIGURE has three series of symbols:

- symbols numbered 1 to 8, relating to the reactor itself and its principal accessories;
- symbols numbered I to IV corresponding to the zones of the reactor and to the steps of the reaction performed in these zones;
- symbols a, a', b, c, c' corresponding to the physical and/or chemical nature of the products present in the reactor.

DESCRIPTION OF THE INVENTION

The explanations that follow will allow one to observe that in the process according to the invention, the reactor at least performs the functions:

- of heating the starting granules (formed primary materials), with hot exhaust gases, that is to say, heat-exchanging gases;
- as a reactor for the pyrolysis of the carbon source (a resin, in general) contained in the granules;
- as a carbonitriding reactor;
- as a heater of the nitrogen entering the reactor, by contact with the granules leaving the hot zone of the furnace.

The reactor diagrammed in the FIGURE, and intended to function practically vertically, essentially includes main tube (1) generally made of graphite, whose length/internal diameter ratio is generally 5–20, preferably 8–15. The central part of the tube is advantageously heated by electromagnetic induction (8). This tube is connected at its upper part to measurer (2) serving to supply the reactor with fresh granules and to a collector of exhaust gases (3); said gases, essentially consisting of CO, $CH_4$, and excess nitrogen are sent to the base of an incineration furnace (not represented). Sensor (4) sets the level of filling of the reactor.

At its lower part, tube (1) is advantageously lengthened with tube (5), for example, one made of stainless steel with at least one supply of nitrogen (7); at the lower end of this tube, sealed volumetric measurer (6), preferably one that is truncated and conical allows for the extraction of the granules while continuously weighing them.

In the process according to the invention, the reactor as described above is continuously fed with fresh granules (a);

said granules are themselves obtained by extrusion or by any equivalent means, and drying, generally at around 150° C., then granulation or sectioning of a paste consisting of a mixture of alumina and carbon, and advantageously, particularly to facilitate the preparation of this paste, by a heat-hardening resin capable of generating carbon during its pyrolysis.

The proportions of carbon and of the resin are adjusted to give the granules both a satisfactory porosity and mechanical strength.

Carbon black supplies a pore volume that is favorable for the carbonitriding speed, and the resin consolidates the granules.

The heat-hardening resin can advantageously be chosen from the formophenol resins in aqueous solution, but it goes without saying that other resins can be used, such as those made of epoxies, polyesters, polyimides, etc.

The carbon black can be chosen from a wide range, as long as the average diameter of the particles of carbon black is 0.5 to 10 μm, preferably 1 to 5 μm, and their pore volume is at least equal to 0.3 cm$^3$/g. On a purely indicative basis, acetylene black will be mentioned in particular, whose pore volume can reach 10 cm$^3$/g.

As for the alumina, it is suitable to choose a very pure alumina, and a particle size on the same order of magnitude as that of the particles of carbon black is recommended. For the preparation of the paste (and of the granules) and for homogenization, it can be advantageous to use a dispersing agent, for example, of the polyacrylic acid ammonium salt-type.

In the preparation of granules (a), one generally uses a total quantity of carbon, that is to say carbon as such and carbon generated by the heat-hardening resin, equal to or greater than the stoichiometric quantity of the carbonitriding reaction (C/Al$_2$O$_3$ ratio=3): this excess can be as much as 100% and is preferably between 0 and 50%.

These supply granules (a) have a pore volume (measured with a mercury porosimeter up to a pressure of 200 MPa), that is greater than 0.05 cm$^3$/g and can reach up to 2 cm$^3$/g, with a crushing strength generally between 0.2 and 3.0 MPa (resistance measured according to the "bulk crushing strength method"—(Shell method)).

The fresh granules (a), which consist of Al$_2$O$_3$+C+resin, are introduced into the reactor, with a constant level maintained due to sensor 4.

Zone I is a zone of heat exchange between the exhaust gases (3) and the granules (a): consequently, these granules are progressively heated (a') in zone I. The large surface area of exchange offered by the granules and the high speed of the nitrogen allow for effective heat transfer.

The movement of the granules leads them to zone II where essentially the pyrolysis of the resin occurs (pyrolyzed granules b).

The granules (b) are progressively heated to reach a temperature corresponding to the carbonitriding temperature of alumina by the reaction of the Al$_2$O$_3$+C granules with N$_2$ supplied at the base of the reactor. This temperature of zone III is generally 1450°–1500° C. It goes without saying that this indication corresponds to the usual value of the carbonitriding temperature, but this temperature can vary depending on the levels where the measurement is done; generally, it can differ by ±10% of the indicated value.

The pyrolyzed granules b are therefore transformed, leaving zone III, into hot carbonitrided granules (c) (AlN+C).

These hot granules (c) continue to move toward the bottom of the reactor and the extraction device, passing through zone IV in which they are swept with the nitrogen supplying the reactor (7), thus allowing heating of the nitrogen intended for the carbonitriding reaction.

One thus extracts, due to measurer (6), cold granules (c') that can contain an excess of carbon (AlN+C); said granules have a residual αAl$_2$O$_3$ content of less than 0.5% with respect to AlN (measurement performed by X-ray diffraction).

The excess carbon can be eliminated by combustion in a gas containing oxygen, preferably at a temperature not exceeding 700° C.

The pure aluminum nitride is finally broken up, for example, in an air-stream crusher, advantageously equipped with a crushing chamber coated with an elastomer to prevent any contamination.

It is advantageous to use a variable-speed selector with the crusher, intended to extract the fine particles from the crushing circuit and to recycle the coarsest ones.

The aluminum nitride powder, as obtained by implementation of the process describe above, is characterized by the fact that it is present in the form of particles with an average size between 0.5 and 5 μm, consisting of AlN with a residual αAl$_2$O$_3$ content not exceeding 0.5% (in terms of weight with respect to AlN) and a BET specific surface area at least equal to 2 m$^2$/g, which can be as much as 5 m$^2$/g. Such a powder is also an objective of the invention. It is appropriate to note the excellence and value of the very low level of residual α-alumina. It is in effect known that AlN powder can contain several types of oxygen, namely weakly bonded oxygen, oxygen in the form of free oxides, or oxygen dissolved in the AlN network (see A. Thomas and G. Müller cfi/Ber. DKG 67 (1990) No. 4, pp. 146–9). The ability to heat the parts made of AlN is dependent on the oxygen remaining in the network after sintering (see Jal. [Journal] of the American Ceramic Society, Vol. 72, No. 11, pp. 2031–42). In order to facilitate the sintering, oxides such as Y$_2$O$_3$ are added to the AlN powder. These oxides combine with the aluminum oxide that surrounds each grain of AlN to form aluminates that are meltable in contact with AlN. The dissolved oxygen then diffuses to the inside of the grains of AlN towards this melted phase. The surface oxygen presents optimum contact with the oxide additives since it is distributed in a thin layer over the whole surface of the powder. It can easily combine with the additives and, from there, can no longer diffuse into the network.

Such is not the case of the residual α-alumina present in the form of small aggregates dispersed in the AlN powder. The probability that it will encounter the additives is very slight, and at the sintering temperatures, around 1850° C., there is a much greater chance for this alumina to dissolve in the AlN, which will contribute to increasing the dissolved oxygen content and therefore to limiting the ability to heat the sintered part. It is therefore essential to reduce the residual Al$_2$O$_3$ content as much as possible, that is to say, to promote the reaction Al$_2$O$_3$+3C+N$_2$→2AlN+CO as much as possible.

Certainly, the increase in the temperature and duration of the reaction can promote this transformation, but to the detriment of the fineness of the grains of AlN and their specific surface area; the reduction of this surface area has an unfavorable effect on the reactivity in sintering.

The great value of the powders and of the process according to the invention is therefore the ability to combine fineness and specific surface area with a very low content of residual α alumina.

The invention will be illustrated by the following example.

EXAMPLES

1. One mixes 504 parts by weight of very pure alumina, finely crushed into grains whose average diameter is 1 μm (ASTM Standard C 678) with 151 parts of acetylene black (average diameter 2 to 3 µm), 335 parts of formophenol resin in an aqueous solution (concentration approximately 60%), and 10 parts of an aluminum polyacrylate dispersing agent.

The mixture is treated in a mixer coated with alumina until disappearance of the white particles of alumina.

The resulting paste serves to supply an extruder equipped with alumina inserts in the extrusion openings. The diameter of the openings is 3 mm.

After forming, the rods are dried at 150° C. in a ventilated oven (weight loss of 13.8%), then are sectioned.

The granules (a) have the following weight composition:

| | |
|---|---|
| alumina | 58.5% |
| carbon | 17.5% |
| resin | 23.5% |
| dispersant | 0.5% |

The pore volume of the granules (mercury porosimeter) is 0.09 cm$^3$/g and the crushing strength is 2.8 MPa.

2. The granules (a) serve to supply a continuously running reactor whose upper part consists of a graphite tube (1) with a length/diameter ratio of 10.

The flow rate of introduction of the granules (a) is 4.4 kg/h (which corresponds to 2.7 kg/h of 100% AlN).

The reactor is supplied in its lower part (7) with nitrogen at a flow rate of 12 kg/h.

In the reactor, the temperature of the hot zone (zone of carbonitriding III) is 1450°–1500° C.; the temperature in zone II (where the pyrolysis of the resin occurs) ranges from 600° to 1000° C.; the exhaust gases leave (at 3) at approximately 450° C. The pyrolysis is accompanied by a weight loss by approximately 12.8%.

The time spent in the carbonitriding zone (granules c) is approximately 12 hours.

The completely transformed and cooled granules (c') are withdrawn at a speed of 2.42 kg/h.

The analysis by X-ray diffraction does not detect any residual α-alumina (detection limit 0.2% Al$_2$O$_3$).

3. The granules (c') are recovered and spread out on Inconel plates in a layer approximately 1 cm thick, then loaded into an electrically heated discontinuous furnace; the temperature is homogeneously maintained at 650°±5° by the circulation of air.

This temperature is maintained for 8 hours. The weight loss is approximately 15%.

After this treatment, the level of residual free carbon is less than 700 ppm; the oxygen content does not exceed 1.1%.

The aluminum nitride obtained in this way is finally broken up in an air-stream crusher with the walls coated with an elastomer.

The average size of the particles of the final AlN is 1.4 µm, and the BET specific surface area of this AlN is 3.5 m$^2$/g.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. A process for the continuous preparation of aluminum nitride, comprising the steps of:

(a) continuously feeding fresh granules at a rate into the top of a vertically oriented reactor to form a circulating bed of granules by flowing the granules downwardly therethrough, and to maintain a constant level of the granules therein, wherein each granule comprises a mixture of alumina, carbon, a resin that generates carbon under pyrolysis and optionally a dispersing agent;

(b) continuously feeding nitrogen into the bottom of the reactor and flowing it upwardly therethrough;

(c) progressively increasing the temperature of the granules as they flow downwardly to pyrolize the resin in the fresh granules in one zone of the reactor at a temperature between about 600° C. to about 1000° C. and then to carbonitride the pyrolized granules in another zone of the reactor beneath said one zone until reading a temperature, corresponding to the temperature of carbonitriding of alumina;

(d) percolating the bed with the upwardly flowing nitrogen under conditions to provide a homogeneous composition of the gas phase around the granules at each level of the reactor;

(e) cooling the downwardly flowing carbonitrided granules with the upwardly flowing nitrogen; and (f) continuously extracting carbonitrided granules from the bottom of the reactor to maintain a homogeneous and constant time spent in the reactor by the granules whereby each granule of reagent participates in the reaction and all granules of reagent participates in substantially the same way.

2. A process according to claim 1, wherein the reaction is performed in a reactor which includes:

a main tube whose central part is heated by electromagnetic induction;

at the upper part of the main tube, a measurer serving to supply the reactor with granules containing alumina, carbon, and a resin that generates carbon by pyrolysis;

also at the upper part of the main tube, sensor that sets the level of filling of the main tube;

at the lower of the main tube, another tube containing at least one intake for nitrogen and, in its lower part, a sealed volumetric measurer allowing for extraction of the granules;

a means for extraction of the exhaust gases also in the upper part of the main tube.

3. A process according to claim 2, wherein the main tube is made of graphite.

4. A process according to claim 2, wherein the other tube is made of stainless steel.

5. A process according to claim 1, wherein supply granules contain alumina and carbon, as well as a resin that generates carbon by pyrolysis, in a total carbon/alumina molar ratio greater than or equal to 3.

6. A process according to claim 5, wherein the supply granules have a pore volume greater than 0.05 cm$^3$/g and a crushing strength between 0.2 and 3.0 MPa.

7. The process of claim 1 wherein each granule consists essentially of said mixture of alumina, carbon and resin.

8. A process for the continuous preparation of aluminum nitride comprising the steps of:

(a) continuously feeding fresh granules at a rate into the top of a vertically oriented reactor to form a circulating bed by flowing the granules downwardly therethrough and maintaining a constant level of granules, wherein each granule comprises a mixture of alumina, carbon, heat-hardening resin and a dispersing agent;

(b) continuously feeding nitrogen into bottom of reactor and flowing it upwardly therethrough;

(c) progressively increasing the temperature of the granules as they flow downwardly to first pyrolize the resin in the fresh granules at a temperature between about 600° to about 1000° C., and then to carbonitride the pyrolized granules at a temperature between about 1450° to about 1500° C.;

(d) cooling the downwardly flowing carbonitrided granules with the upwardly flowing nitrogen;

(e) continuously collecting carbonitrided granules from the bottom of the reactor to maintain a constant time spent in the reactor by the granules;

(f) after said continuous aluminum nitride preparation process, removing excess carbon from the granules; and (g) crushing the granules to size, such that aluminum nitride is obtained in the form of particles having an average size between 0.5 and 5 µm, and α-alumina content not exceeding 0.5% and with a BET specific surface area equal to at least about 1 m²/g.

9. The process of claim 8 further comprising collecting exhaust gases from the top of the reactor.

10. The process of claim 9 wherein the temperature of the exhaust gases is about 450° C.

11. The process of claim 10 wherein the heating is provided at least in part by exchange with the upwardly flowing nitrogen and exhaust gases.

12. The process of claim 11 wherein each fresh granule comprises about 58.5 weight % of alumina, about 17.5 weight % carbon, about 23.5 weight % resin and about 0.5 weight % dispersant, wherein the flow rate of the granules is about 4.4 Kg/h, and wherein the flow rate of the nitrogen is about 12 Kg/h.

13. a process for the continuous preparation of aluminum nitride, comprising the steps of:

(a) continuously feeding fresh granules at a rate into the top of a vertically oriented circulating-bed reactor to form a circulating bed of granules by flowing the granules downwardly therethrough, and to maintain a constant level of the granules therein, wherein each granule comprises a mixture of alumina, carbon, a resin that generates carbon under pyrolysis and optionally a dispersing agent;

(b) continuously feeding nitrogen into the bottom of the reactor and flowing it upwardly therethrough;

(c) progressively increasing the temperature of the granules as they flow downwardly to first pyrolize the resin in the fresh granules in one zone of the reactor at a temperature between about 600° C. to about 1000° C. and then to carbonitride the pyrolized granules in another zone of the reactor beneath said one zone until reading a temperature, corresponding to the temperature of carbonitriding of alumina;

(d) percolating the bed with the upwardly flowing nitrogen under conditions to provide a homogeneous composition of the gas phase around the granules at each level of the reactor;

(e) cooling the downwardly flowing carbonitrided granules with the upwardly flowing nitrogen; and (f) continuously extracting carbonitrided granules from the bottom of the reactor to maintain a homogeneous and constant time spent in the reactor by the granules whereby each granule of reagent participates in the reaction and all granules of reagent participates in substantially the same manner;

(g) after said continuous aluminum nitride preparation process of steps (a) through (f), removing excess carbon from the granules removed from the reactor in step (e); and (h) crushing the granules to size, such that aluminum nitride is obtained in the form of particles having an average size between 0.5 and 5 µm, α-alumina content not exceeding 0.5% and with a BET specific surface area equal to at least about 2m²/g.

* * * * *